United States Patent
Pesquet-Popescu

(10) Patent No.: US 6,782,051 B2
(45) Date of Patent: Aug. 24, 2004

(54) VIDEO ENCODING METHOD BASED ON A WAVELET DECOMPOSITION

(75) Inventor: Beatrice Pesquet-Popescu, Fontenay-sous-Bois (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 618 days.

(21) Appl. No.: 09/923,867

(22) Filed: Aug. 6, 2001

(65) Prior Publication Data

US 2002/0101922 A1 Aug. 1, 2002

(30) Foreign Application Priority Data

Aug. 8, 2000 (EP) .............................................. 00402246

(51) Int. Cl.[7] .............................................. H04N 7/12
(52) U.S. Cl. .............................. 375/240.11; 375/240.11; 375/240.18
(58) Field of Search ...................... 375/240.11, 240.12, 375/240.18, 240.19, 240.23, 240.24; 382/232, 233, 240, 248, 260; 348/394.1, 398.1, 403.1; H04N 7/12

(56) References Cited

U.S. PATENT DOCUMENTS

| | | | | |
|---|---|---|---|---|
| 5,262,958 A | * | 11/1993 | Chui et al. .................... | 702/75 |
| 5,600,373 A | * | 2/1997 | Chui et al. ................ | 375/240.1 |
| 5,757,309 A | * | 5/1998 | Brooks et al. ................. | 342/90 |
| 5,881,176 A | * | 3/1999 | Keith et al. ................... | 382/248 |
| 5,946,417 A | * | 8/1999 | Bonneau et al. ............ | 382/236 |
| 6,211,515 B1 | * | 4/2001 | Chen et al. .............. | 250/252.1 |
| 6,381,276 B1 | * | 4/2002 | Pesquet-Popescu .... | 375/240.11 |

OTHER PUBLICATIONS

A. Said, "A New, Fast, and Efficient Image Codec Based on Set Partiioning in Hierarchical Trees", vol. 6, Jun. 1996, pp 243–250.

P. Desarte et al, "IEEE Transactions on Information Theory", vol. 38, Mar. 1992, pp897–904.

P. Moulin, IEEE Transactions on Image Processing, vol. 4, Sep. 1995, pp 1269–1281. I. Daubechies, W. Sweldens, "Factoring Wavelet Transforms into Lifting Steps", vol. 4, pp247–269, 1998.

* cited by examiner

*Primary Examiner*—Nhon Diep

(57) ABSTRACT

The invention relates to a method for encoding a video sequence subdivided into groups of frames. This method comprises an on-line procedure in which a three-dimensional wavelet decomposition is performed involving a biorthogonal filter bank in a lifting scheme using optimal weighting constants. These constants are determined thanks to an additional off-line procedure in which a similar decomposition is performed but without any weighting constants.

3 Claims, 2 Drawing Sheets ured as the sum of subband distorsions (that is why it is
VIDEO ENCODING METHOD BASED ON A WAVELET DECOMPOSITION

FIELD OF THE INVENTION

The present invention relates to an encoding method applied to a video sequence subdivided into groups of frames (GOFs) and based on an on-line procedure that comprises the steps of:

- an initializing step, provided for defining for the encoding process its input parameters;
- a motion estimation/compensation step, provided for performing a motion estimation and compensation between pairs of successive frames;
- a spatio-temporal decomposition step, provided for carrying out a three-dimensional (3D) wavelet decomposition using a biorthogonal filter bank in a so-called lifting scheme itself using weighting constants defined in the initialization step;
- an encoding step, provided for encoding the transform coefficients thus obtained, by means of an encoding method adapted to 3D decompositions.

BACKGROUND OF THE INVENTION

In video compression schemes, the reduction of temporal redundancy is mainly achieved by two types of approaches. In the first one, the so-called "hybrid" or predictive approach, a prediction of the current frame is computed based on the previously transmitted frames, and only the prediction error is intra-coded and transmitted. In the second one, the temporal redundancy is exploited by means of a temporal transform, the 3D (or 2D+t) approach, which is similar to spatial techniques for removing redundancies. According to this last approach, the sequence of frames is processed as a 3D volume, and the classical subband decomposition often used in image coding can thus be extended to 3D spatio-temporal data by using separable transforms (for example, wavelet or wavelet packets transforms implemented by means of filter banks). Obviously, there is, in the 3D structure, an anisotropy, which can however be taken into account by using different filter banks in the temporal and spatial directions (usually, Haar filters are used for temporal filtering since the added delay of using longer filters is undesirable; furthermore, they are two-tap filters and are the only perfect reconstruction orthogonal filters which do not present the boundaries effect).

The coding efficiency of this 3D coding scheme can be improved by performing motion estimation/compensation in the low temporal subbands, at each level of the temporal decomposition. The 3D subband decomposition is applied on the compensated group of frames (this group of frames must contain a power of two number of frames, usually 16), and, at the last temporal decomposition level, there are two frames in the lowest temporal subband. In each frame of the temporal subbands, a spatial decomposition is performed.

Subband coding the three-dimensional structure of data can be realized as an extension of the spatial subband coding techniques. One of the most effective wavelet-based scheme for image compression is based on the 2D SPIHT algorithm, described in a detailed manner in "A new, fast, and efficient image codec based on set partitioning in hierarchical trees (=SPIHT)", by A. Said and W. A. Pearlman, IEEE Transactions on Circuits and Systems for Video Technology, vol.6, June 1996, pp.243–250, and recently extended to the 3D structures. The basic concepts used in the 3D coding technique are the following: spatio-temporal trees corresponding to the same location are formed in the wavelet domain, then the wavelet transform coefficients in these trees are partitioned into sets defined by the level of the highest significant bit in a bit-plane representation of their magnitudes, and, finally, the highest remaining bit planes are coded and the resulting bits are transmitted.

The original SPIHT algorithm is based on the hypothesis of an orthogonal decomposition, according to which the reconstruction error is equal to the quantization error measured as the sum of subband distorsions (that is why it is possible to distribute the bit budget based on the energy of each subband). It has also been shown that the best results in image and video coding are not achieved using orthogonal filters, but biorthogonal ones (this is due to the fact that the symmetry of biorthogonal filters yields wavelet coefficients at the same spatial location as their parents). However, as biorthogonal filters do not preserve the $L^2$ norm of the quantization error, the bit repartition deduced for an orthogonal transform would not lead to the minimum reconstruction error.

Moreover, biorthogonal filters are determined up to a multiplicative constant and therefore an infinity of filter banks may be designed when only the perfect reconstruction condition is imposed. If a lifting implementation of the filter bank is used, it is known that the polyphase matrix $P(z)$ can always be decomposed into factors $$P(z) = \prod_{i=1}^{m} \begin{bmatrix} 1 & s_i(z) \\ 0 & 1 \end{bmatrix} \begin{bmatrix} 1 & 0 \\ t_i(z) & 1 \end{bmatrix} \begin{bmatrix} K & 0 \\ 0 & 1/K \end{bmatrix},$$

where $t_i$ and $s_i$ are Laurent polynomials and K is a real constant. The dual polyphase matrix, corresponding to the synthesis part, is given in this case by:

$$\tilde{P}(z) = \prod_{i=1}^{m} \begin{bmatrix} 1 & 0 \\ -s_i(z^{-1}) & 1 \end{bmatrix} \begin{bmatrix} 1 & -t_i(z^{-1}) \\ 0 & 1 \end{bmatrix} \begin{bmatrix} 1/K & 0 \\ 0 & K \end{bmatrix}.$$

The perfect reconstruction is insured for all K, since:

$$P(z)\tilde{P}(z^{-1})^t = I$$

This decomposition is implemented through the dual schemes illustrated in FIGS. 1 and 2. There exists therefore an infinity of implementations, corresponding to different factorizations and different values of the constant K. From the coding point of view, these filter banks are not all equivalent. A usual criterion for choosing this multiplicative constant is to impose the determinant of the polyphase matrix to be equal to 1, but this choice may not be the best for coding performances (that is why most of the usual algorithms are based on biorthogonal transforms that are nearly orthogonal).

SUMMARY OF THE INVENTION

It is therefore an object of the invention to propose a technique for improving the applicability of highly non-orthogonal wavelet transforms for video coding schemes, based on a 3D wavelet decomposition and an automatic bit allocation mechanism.

To this end, the invention relates to an encoding method such as defined in the introductory part of the description and which is moreover characterized in that it also comprises an off-line procedure that consists of off-line computations including the sub-steps of:

defining for these off-line computations the same type of input parameters, with the exception of the weighting constants;

carrying out a random GOF generation sub-step, the generated GOF containing a white, Gaussian noise of mean and standard deviation adapted to the representation of the original sequence;

implementing a 3D wavelet decomposition based on said lifting scheme and using the same filter bank without any weighting constants;

computing the standard deviations of the spatio-temporal sub-bands resulting from said 3D decomposition;

dividing said standard deviations by the standard deviation of the noise, optimal weighting constants being available at the output of said division sub-step and sent towards said filter bank in order to allow to weight the output of the spatio-temporal sub-bands.

Based on the energy repartition in subbands, the optimal weights for the biorthogonal filters in a 3D decomposition are thus determined. Some complicated methods based on relaxation algorithms are already used in the literature for choosing these constants in the framework of image coding, for instance the method described in "A multiscale relaxation algorithm for SNR maximization in non-orthogonal subband coding", by P. Moulin, IEEE Transactions on Image Processing, vol.4, n°9, September 1995, pp.1269–1281. Techniques exploiting the human visual system in order to make the reconstruction error subjectively more acceptable also exist, such as the one described in "Signal-adapted multiresolution transform for image coding", by P. Desarte and al, IEEE Transactions on Information Theory, vol.38, n°2, March 1992, pp.897–904. However, all these existing algorithms refer to image coding, while the method here proposed—an extension of previous works to the case of a 3D wavelet decomposition—is dedicated to video coding. This method may be applied to any type of linear filter, in particular in the framework of a motion compensated temporal filtering.

BRIEF DESCRIPTION OF THE DRAWINGS

The present invention will now be described, by way of example, with reference to the accompanying drawings in which.

DETAILED DESCRIPTION OF THE INVENTION

Figure 1:
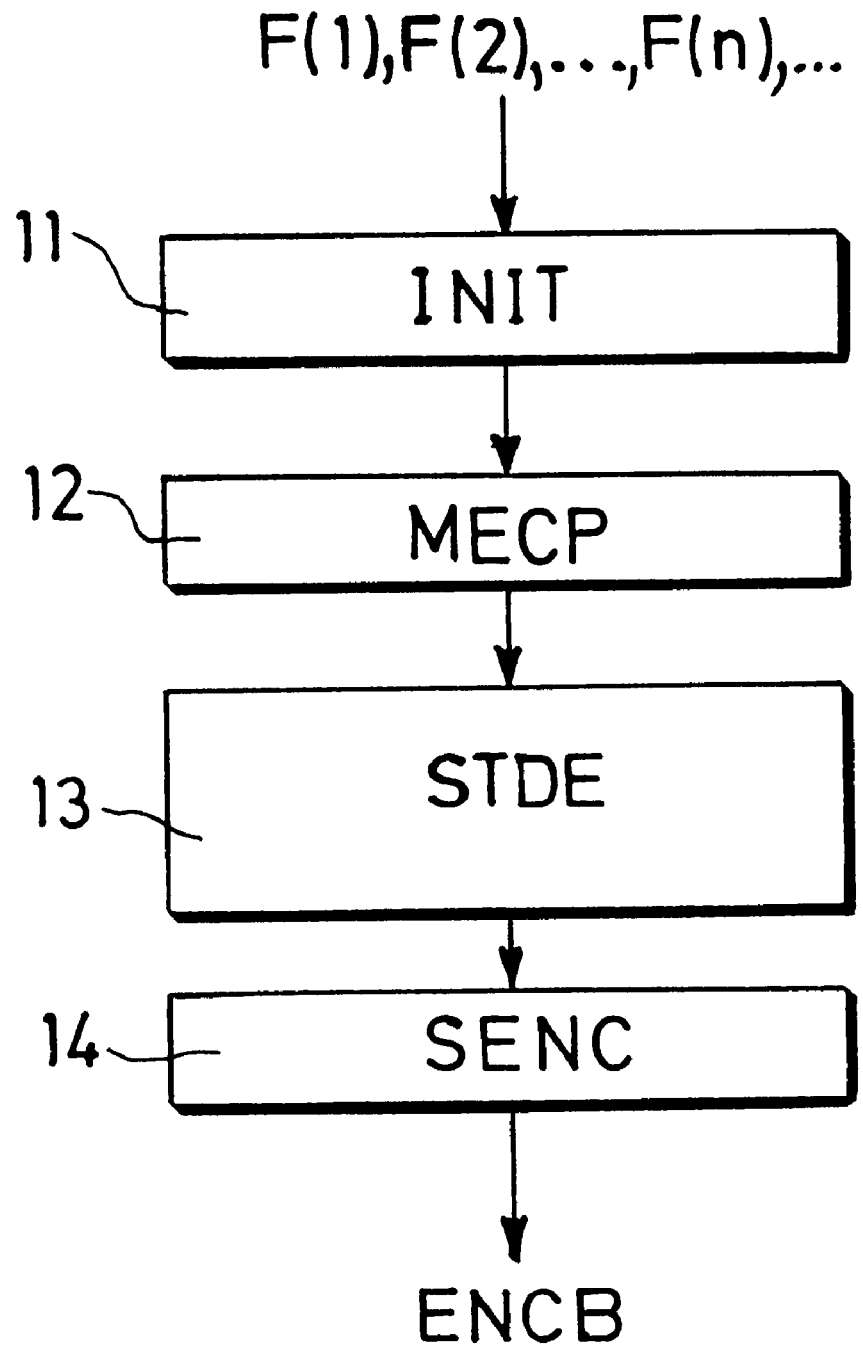
FIG. 1 is a global video coding scheme based on a 3D wavelet decomposition followed by a SPIHT-like coding algorithm.

A conventional video coding scheme based on a 3D wavelet decomposition followed by a SPIHT-like coding algorithm is shown in FIG. 1. The original video sequence, comprising successive frames F(1), F(2), . . . , F(n), . . . , is subdivided into groups of frames (GOFs) of the same size as those used in compressing, containing a Gaussian white noise (random variables independent, identically distributed following a normal law). The input parameters being defined (number of GOF frames, wavelet type, sub-optimal weights) in an initialization step 11 (INIT), the coding scheme also comprises successively a motion estimation/compensation step 12 (MECP), a 3D spatio-temporal decomposition step 13 (STDE), using filter banks with sub-optimal constants, and a SPIHT-like encoding step 14 (SENC), at the output of which the encoded bitstream (ENCB) is available.

Figure 2:
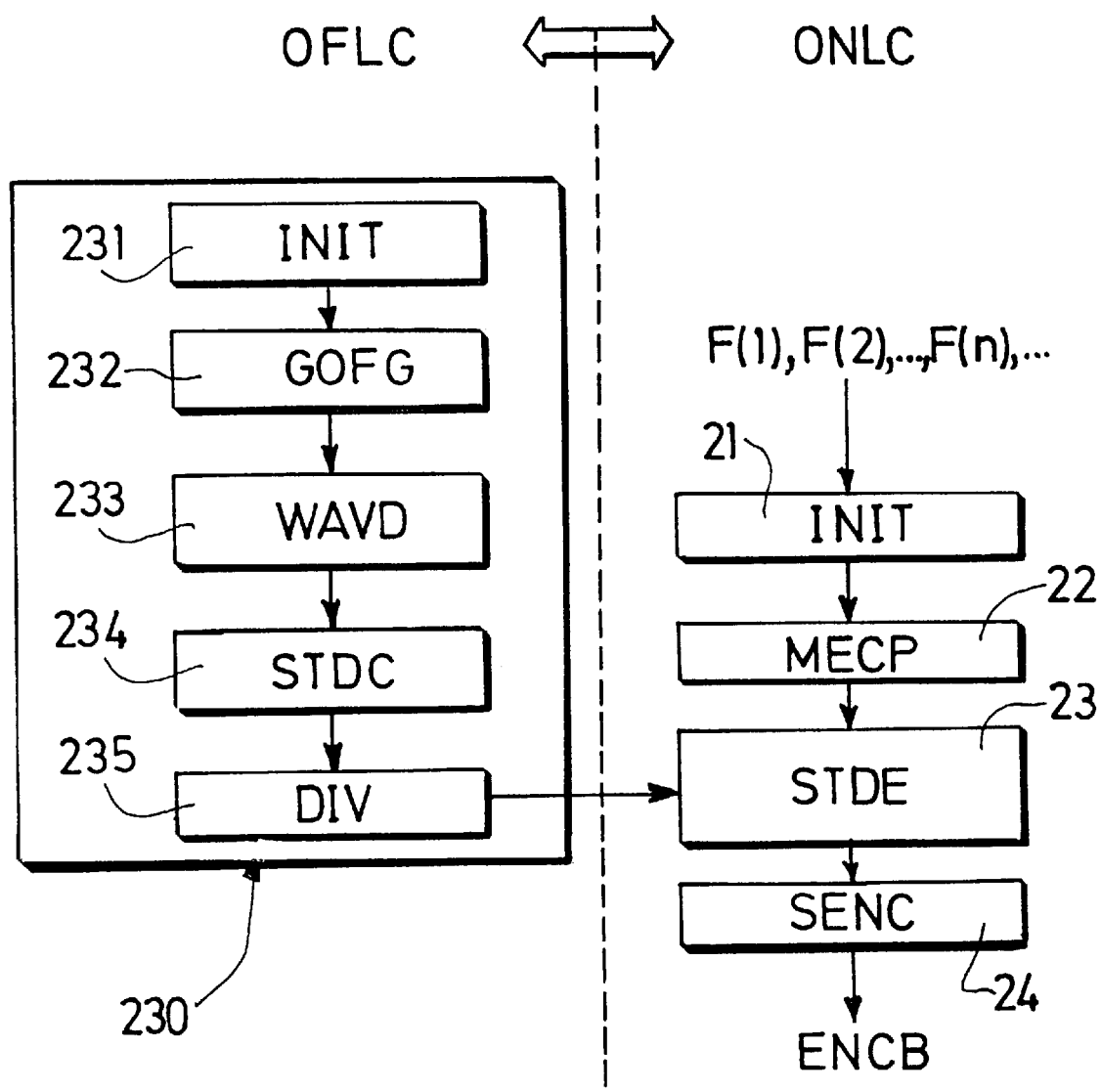
FIG. 2 gives the global video coding scheme, which, according to the invention, includes a step of optimization of the filter bank, itself subdivided into successive operations carried out for computing optimal weighting constants for the 3D spatio-temporal decomposition.

The global video coding scheme according to the invention, shown in FIG. 2 and which comprises steps 21, 22, 23, 24 similar to the steps 11 to 14 is modified in the following manner: with respect to the on-line computations ONLC carried out according to the successive steps of FIG. 1, off-line computations are introduced in order to optimize the computation operation of the weighting factors used in the 3D spatio-temporal decomposition step. This decomposition step, now referenced 23, uses weighted filter banks with optimal constants. These off-line computations OFLC, appearing in FIG. 2 in the module 230, in the left part of the figure, are now described.

First, as previously for the scheme of FIG. 1, the input parameters are defined (number of GOF frames, wavelet type, . . . ) during a definition sub-step 231 (INIT), followed by a random GOF generation sub-step 232 (GOFG). Concerning the Gaussian white noise, as the original images are represented with 8 bits (i.e. by values ranging from 0 to 255), a Gaussian distribution with a mean equal to 128 and a standard deviation equal to 32 has been chosen. The values inside each frame therefore satisfy the following equation:

$$F(m,n)=(32 \times N(m,n))+128$$

where N(m,n) is a Gaussian white noise with zero mean and unit standard deviation. This condition ensures that almost all the generated values are inside the interval (0,255) in which the input values of the coefficients are located (it may nevertheless be noted that the exact values of the mean and standard deviation of the distribution are not essential, as soon as the condition to include almost the whole dynamic range of the coefficients into a convenient confidence interval is satisfied).

A wavelet decomposition sub-step 233 (WAVD) is then provided, that uses for instance the lifting scheme described in "Factoring wavelet transforms into lifting steps", I. Daubechies and W. Sweldens, Bell Laboratories technical report, Lucent Technologies, 1996. The random generated GOF is decomposed using the filters without any weighting constants (K=1). A sub-step 234 (STDC) then allows to compute the standard deviations of the resulting spatio-temporal sub-bands, and these standard deviations are divided by 32 (the standard deviation of the noise) in order to obtain at the output of a division sub-step 235 (DIV) the optimal weights to be sent to the decomposition step 23 (indeed, dividing the coefficients in each sub-band by the standard deviation corresponding to the sub-band leads to a unit standard deviation of each sub-band, which means that the energy in each sub-band is equal to the unity, as it is the case with an orthonormal decomposition).

This optimal energy repartition finally allows to use—in the encoding step 24— the SPIHT algorithm under the same hypotheses as those implied by an orthonormal decomposition: the coefficients are sent bitplane by bitplane, and the reconstruction error is equal to the quantization error. This leads to maximum coding gains for a given filter bank.

As it has been seen, the present technique has been applied to the original random GOF, without motion estimation and compensation, in order to compute the weighting factors. Once these constants have been got, the spatio-temporal decomposition is applied to the motion compensated GOF. This technique is justified by the fact that the temporal decomposition has to be orthogonal in the direction of the movement. Indeed, by performing the temporal filtering after the motion compensation, only points belonging to the same trajectory are filtered together.

What is claimed is:

1. An encoding method applied to a video sequence subdivided into groups of frames (GOFs) and based on an on-line procedure that comprises the steps of:

an initialization step, provided for defining for the encoding process its input parameters;

a motion estimation/compensation step, provided for performing a motion estimation and compensation between pairs of successive frames;

a spatio-temporal decomposition step, provided for carrying out a three-dimensional (3D) wavelet decomposition using a biorthogonal filter bank in a so-called lifting scheme itself using weighting constants defined in the initialization step;

an encoding step, provided for encoding the transform coefficients thus obtained, said method being characterized in that it also comprises an off-line procedure that consists of off-line computations including the sub-steps of:

defining for this off-line procedure the same type of input parameters, with the exception of the weighting constants;

carrying out a random GOF generation sub-step, the generated GOF containing a white, Gaussian noise of mean and standard deviation adapted to the representation of the original sequence;

implementing a 3D wavelet decomposition based on said lifting scheme and using the same filter bank without any weighting constants;

computing the standard deviations of the spatio-temporal sub-bands resulting from said 3D decomposition;

dividing said standard deviations by the standard deviation of the noise, optimal weighting constants being available at the output of said division sub-step and sent towards said filter bank in order to allow to weight the output of the spatio-temporal sub-bands.

2. An encoding method according to claim 1, in which said encoding method is the so-called SPIHT algorithm.

3. An encoding method according to claim 1, in which, for an original video sequence represented on 8 bits with values from 0 to 255, a mean of 128 and a standard deviation of 32 are used for the luminance component and a mean of 128 and a standard deviation of 20 are used for the chrominance components.

* * * * *